(12) United States Patent
Wagner et al.

(10) Patent No.: US 6,196,782 B1
(45) Date of Patent: Mar. 6, 2001

(54) PUSH PIN

(75) Inventors: David Karl Wagner; Christa Caren Wagner, both of Charlotte, NC (US)

(73) Assignee: Plush Pins, LLC, Charlotte, NC (US)

( * ) Notice: Subject to any disclaimer, the term of this patent is extended or adjusted under 35 U.S.C. 154(b) by 0 days.

(21) Appl. No.: 09/443,224

(22) Filed: Nov. 18, 1999

(51) Int. Cl.$^7$ ..................................... F16B 15/02
(52) U.S. Cl. .................. 411/485; 411/439; 411/923; 248/507
(58) Field of Search .................... 411/439, 480, 411/485, 923, 400; 248/507–509

(56) References Cited

U.S. PATENT DOCUMENTS

| D. 024,631 | 8/1895 | Warren . |
| D. 024,632 | 8/1895 | Warren . |
| D. 025,266 | 3/1896 | Warren et al. . |
| D. 026,960 | 4/1897 | Walker . |
| D. 038,351 | 12/1906 | Wyman . |
| D. 038,352 | 12/1906 | Wyman . |
| 112,378 | 3/1871 | Porter . |
| D. 149,099 | 3/1948 | Sweet . |
| D. 188,950 | 10/1960 | Miller . |
| D. 237,681 | 11/1975 | Knohl et al. . |
| D. 243,580 | 3/1977 | DeCaro . |
| D. 275,555 | 9/1984 | Giggey . |
| D. 286,612 | 11/1986 | Adams . |
| D. 300,508 | 4/1989 | Viening . |
| D. 409,663 | 5/1999 | Wagner et al. . |
| D. 410,032 | 5/1999 | Wagner et al. . |
| D. 414,207 | 9/1999 | Wagner et al. . |
| 482,257 | 9/1892 | Larkin . |
| 816,095 | 3/1906 | House . |
| 1,066,495 | * 7/1913 | Miller . |
| 1,099,137 | * 6/1914 | Williams . |
| 1,182,305 | 5/1916 | Norcross . |
| 1,207,960 | 12/1916 | McNeill . |
| 1,338,154 | 4/1920 | Pipkin . |
| 1,392,950 | * 10/1921 | Lawrence . |

(List continued on next page.)

FOREIGN PATENT DOCUMENTS

959255 * 2/1957 (DE) .

OTHER PUBLICATIONS

Framing Tacks (7495A), Sporty's Pilot Shop (catalog), Summer 1999.
Instruction sheet for CornerIts™ tacks, which is the subject of U.S. Patent No. 5,199,681 (Cite No. 27).

Primary Examiner—Flemming Saether
(74) Attorney, Agent, or Firm—Alston & Bird LLP

(57) ABSTRACT

A push pin is provided for securing pieces of paper, photographs, postcards, posters and similar items to a support surface without puncturing or otherwise damaging the item. The push pin includes a body portion and a pin. In a preferred embodiment, the body portion defines a raised circumferential portion to facilitate insertion and withdrawal of the push pin. In one embodiment, the push pin includes a linear spring extending from the body portion to a distal end. Advantageously, the distal end of the linear spring at least partially contacts the item and urges the item towards the support surface. In an alternate embodiment, the body portion defines a groove defining an elongate member extending from the body portion to a distal end. Advantageously, the distal end of the elongate member at least partially contacts the item and urges the item towards the support surface without piercing or otherwise damaging the item. In still another embodiment, the body portion defines a recessed surface for at least partially contacting the item and urging the item towards the support surface such that the item is secured between the said recessed surface and the support surface.

20 Claims, 5 Drawing Sheets

U.S. PATENT DOCUMENTS

| | | |
|---|---|---|
| 1,991,561 | 2/1935 | Krantz . |
| 2,266,432 | 12/1941 | Morin et al. . |
| 3,121,365 * | 2/1964 | Hatashi . |
| 3,205,757 | 9/1965 | Kuennen . |
| 3,361,461 | 1/1968 | MacPhail, Sr. . |
| 5,199,681 | 4/1993 | Reidy . |
| 5,370,487 | 12/1994 | Kracke . |
| 5,575,122 | 11/1996 | Hamilton et al. . |

* cited by examiner

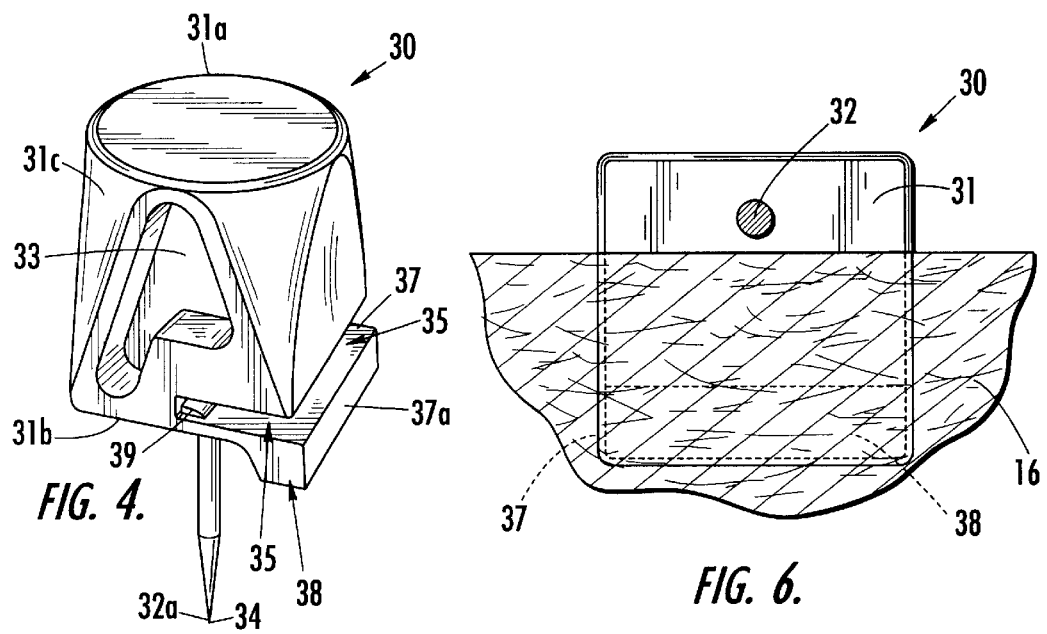
FIG. 4.
FIG. 6.
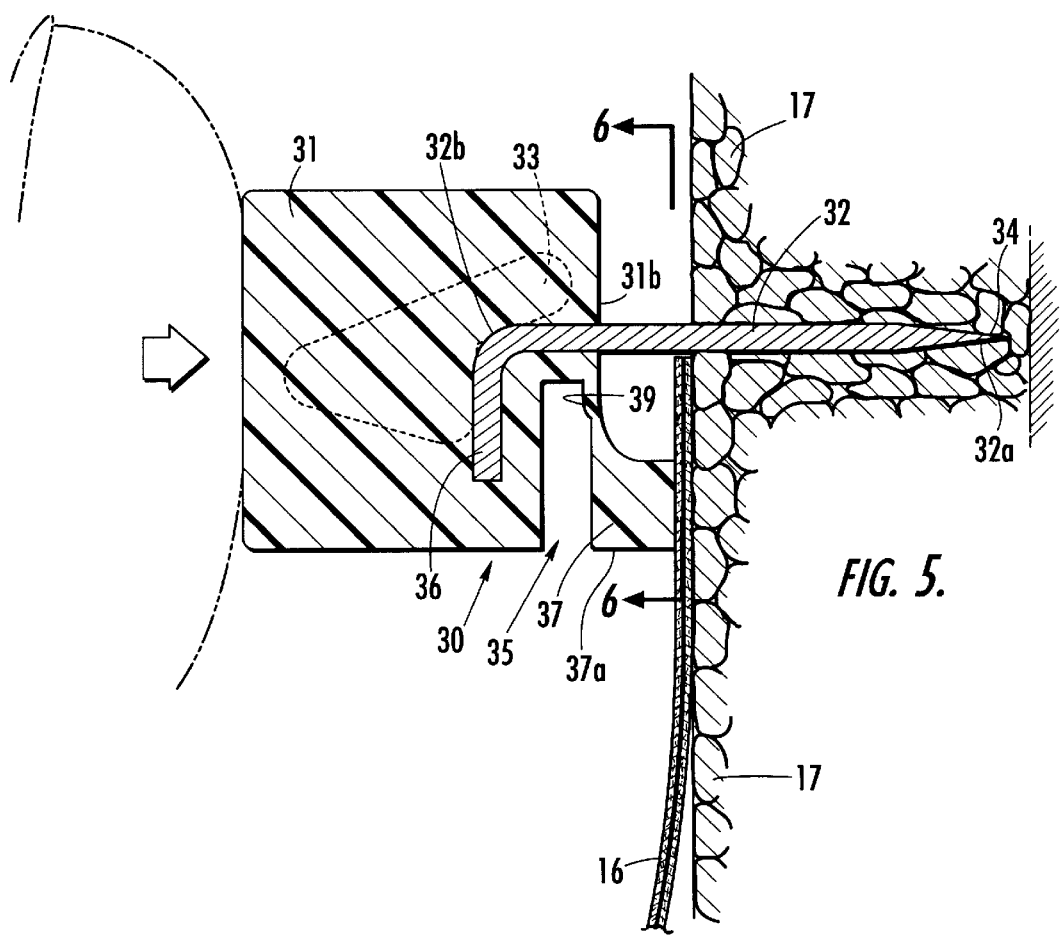
FIG. 5.

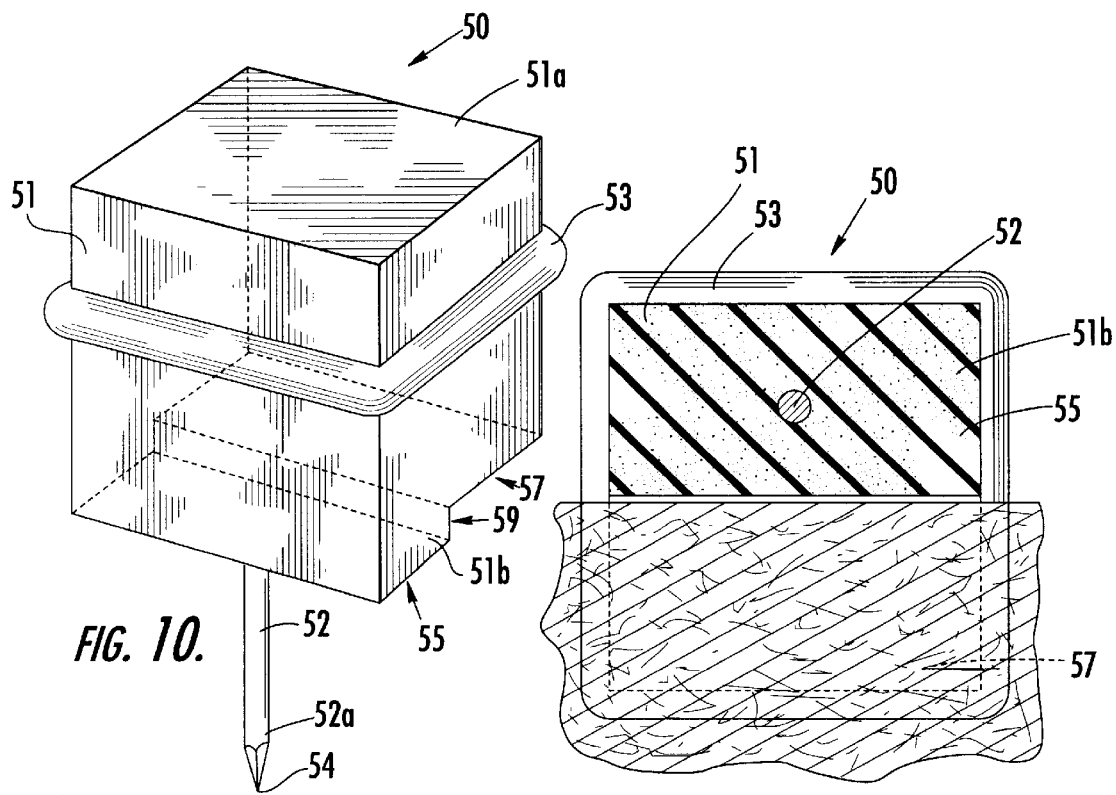
FIG. 10.
FIG. 12.
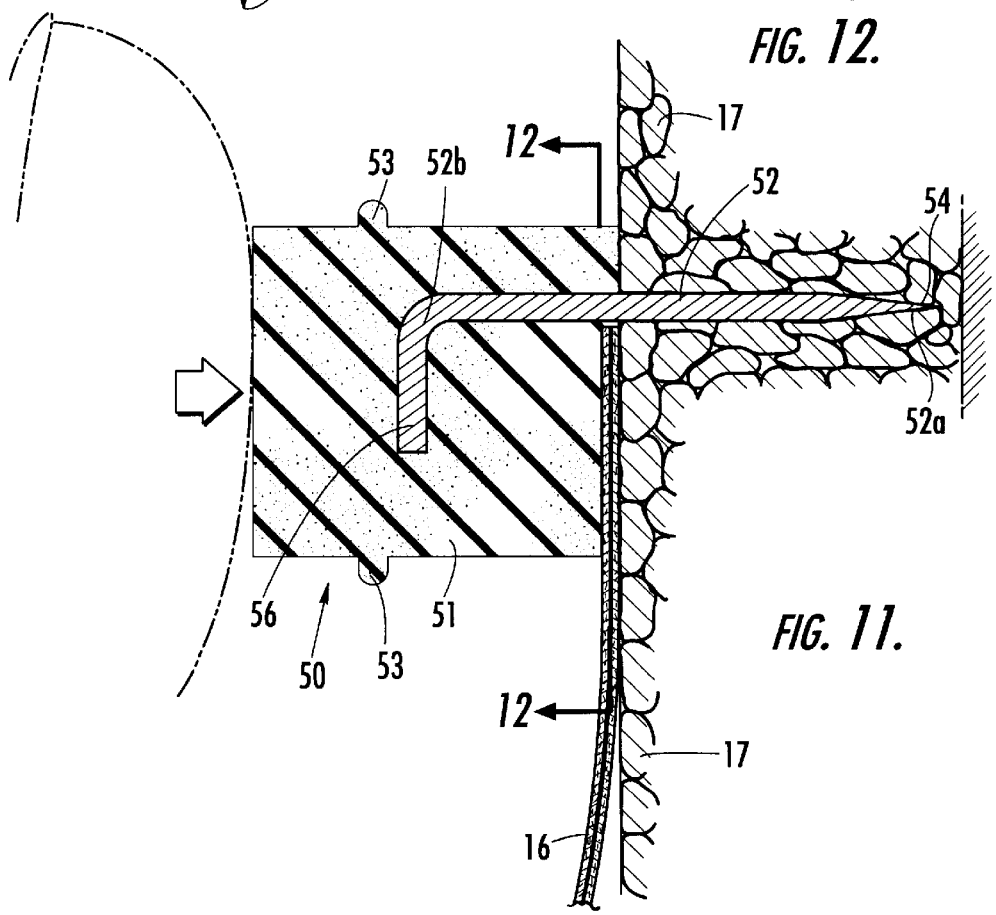
FIG. 11.

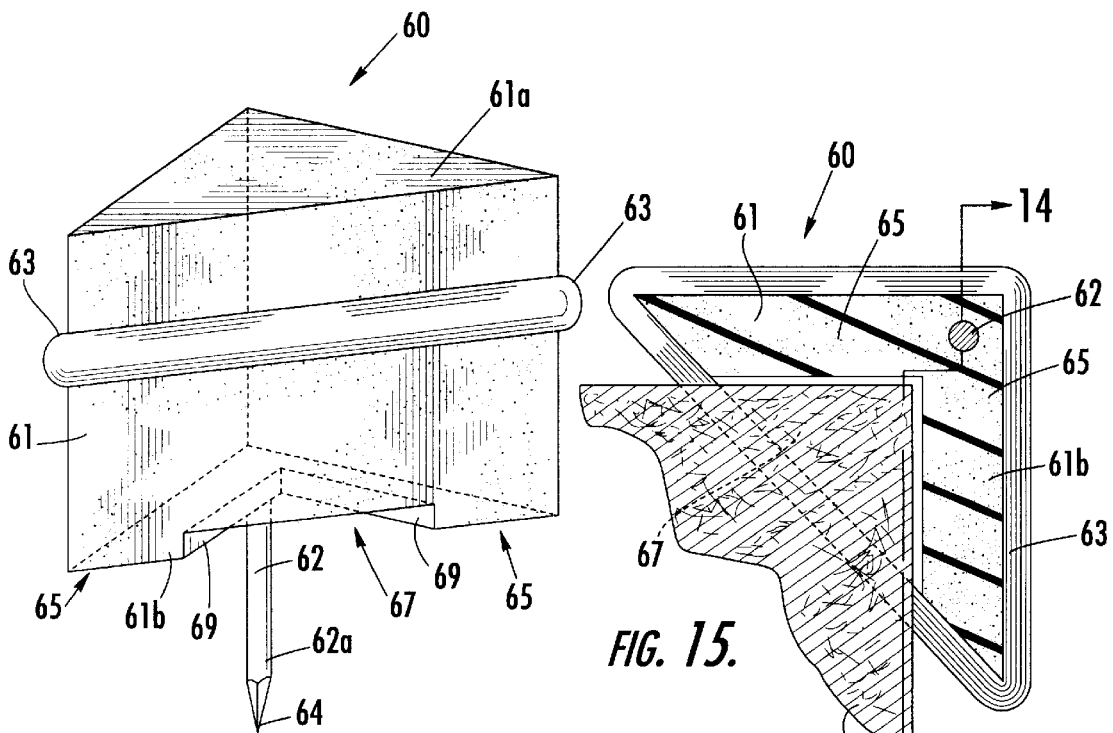
FIG. 13.
FIG. 15.
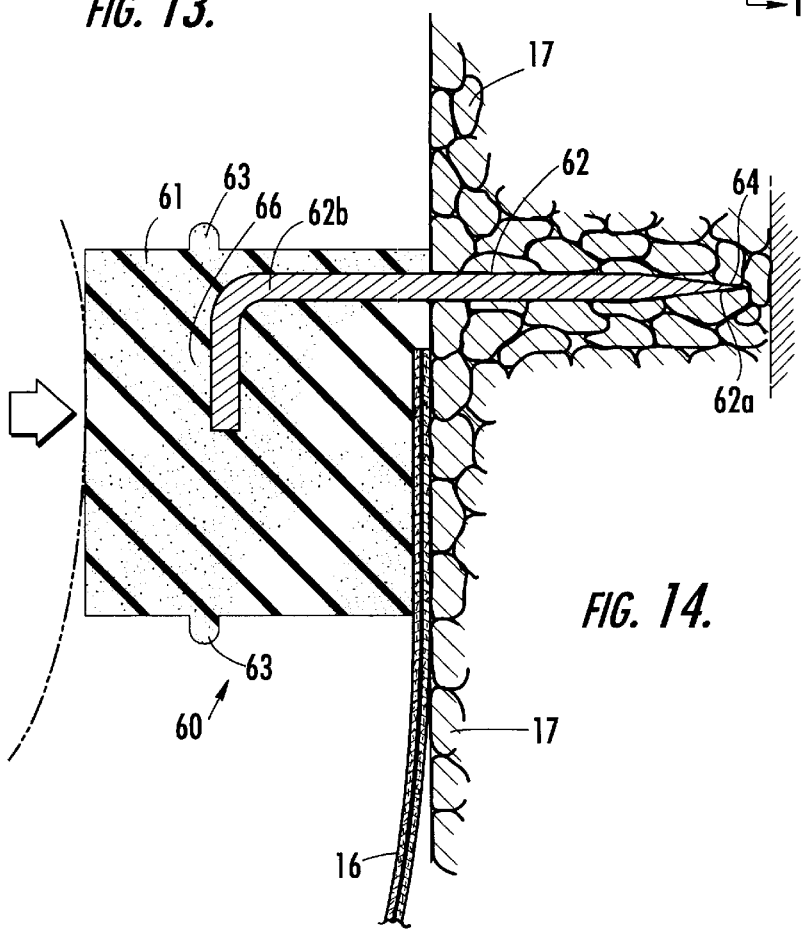
FIG. 14.

PUSH PIN

FIELD OF THE INVENTION

The present invention relates to an apparatus for securing an item to a support surface and, more particularly, relates to a push pin.

BACKGROUND OF THE INVENTION

Push pins or thumbtacks (collectively referred to herein as "push pins") are used to secure pieces of paper, photographs, postcards, posters and similar items on a support surface, such as a wall, ceiling or bulletin board. Conventional push pins typically have a head and a pin. The head generally has a planar base and is usually formed of metal or injection molded plastic. The pin has first and second ends, wherein the first end is shaped into a point for insertion into the support surface. The second end of the pin is attached to or anchored within the head such that the pin projects outwardly from the base of the head.

When securing an item to a support surface using one or more conventional push pins, the item is first positioned on the support surface in a pre-selected location and orientation. Thereafter, the item is secured to the support surface by inserting the corresponding pin of one or more push pins through the item and into the support surface. To firmly anchor each push pin within the support surface, the entire portion of the pin that projects beyond the base of the head is usually inserted into the support surface. Although the portion of the item surrounding the pin may be positioned between the base of the head and the support surface, the item is primarily secured in place by the pin, especially where the item is secured to a support surface having a vertical orientation, such as a wall or bulletin board mounted to a wall.

As the pin of a push pin pierces through the item, the pin creates a hole or opening in the item. Over time, this hole can expand due to the weight of the item bearing against the pin and, in some instances, can even result in a tear forming in the item. In either case, the effectiveness of the push pin to secure the item to the support surface can be diminished. In addition, where the item is of value or is to be reused, for example, a photograph, the damage caused by the pin of the push pin is not only aesthetically displeasing, but may be irreparable.

In seeking better apparatuses for securing items to a support surface, several types of tacks have been proposed. One such example is disclosed in U.S. Pat. No. 5,199,681 to Reidy, which discloses an L-shaped framing tack used to frame square or rectangular items, such as charts, certificates, posters, and maps. The tack has a unitary body portion that includes first and second perpendicularly disposed arms. The underside of each arm has a ridge extending along the outer edge of the arm such that the interior surface of each arm is recessed. A pin projects outwardly from the underside of the body portion at the intersection of the raised outer edges of the first and second arms. At the intersection of the first and second arms, the body portion also includes a flange that extends between the raised outer edges of the arms and which is spaced apart from the recessed interior surfaces of the arms. The spaced region or slot defined between the flange and the recessed interior surfaces of the arms is adapted to removably receive the corner of an item and a locking mechanism. The locking mechanism includes a base defining a groove and ridge and a slidable top portion defining a corresponding groove and ridge. When the top portion is slid into a position such that the ridge of the top portion is seated within the groove of the base, the locking mechanism is in the unlocked position and can be removed from the slot. When the locking mechanism is inserted into the slot and the top portion is slid into a position such that the ridge of the top portion is seated on the ridge of the base, the locking mechanism is in the locked position and is wedged between the flange and the recessed interior surfaces of the arms.

An item is secured to a support surface using a set of four L-shaped tacks by inserting each corner of the item into the slot defined between the flange and recessed interior surface of the first and second arms of a corresponding tack. The corresponding locking mechanism is then inserted into the slot such that the base of the locking mechanism is pressed against the corner of the item. The top portion of the locking mechanism is then slid into the lock position thereby securing the corner of the item between the base of the locking mechanism and the recessed interior surface of the first and second arms. The pin of each tack is then inserted into the support surface. The L-shaped framing tacks are effective in securing square or rectangular items that have corners, but not circular or other curvilinear items. In addition, the body portion is relatively flat, which can make the tacks difficult to grip when inserting or withdrawing the tacks.

Thus, there is a need for an improved push pin for use in securing items to a support surface. The push pin must be capable of securing an item to the support surface without puncturing or otherwise damaging the item. The push pin must also be capable of securing items having square, rectangular and curvilinear geometries. Additionally, the head of the push pin should facilitate gripping by the user when inserting and withdrawing the push pin into and out of the support surface, respectively.

SUMMARY OF THE INVENTION

The present invention provides a push pin for securing an item to a support surface without puncturing or otherwise damaging the item. The push pin includes a body portion and a pin. In preferred embodiments, the body portion has a curvilinear, square, rectangular, or triangular configuration. According to another preferred embodiment, the body portion is formed of an elastomer. In yet another preferred embodiment, the body portion defines a raised circumferential portion to facilitate insertion and withdrawal of the push pin by the user into and out or the support surface, respectively.

The pin of the push pin has first and second ends. The first end of the pin defines a point adapted for insertion into the support surface. The second end of the pin is secured to the body portion. According to one preferred embodiment, the central axis of the pin coincides with the central axis of the body portion. According to another preferred embodiment, the central axis of the pin is offset from the central axis of the body portion.

In one embodiment, the push pin includes a linear spring extending from the body portion to a distal end. Advantageously, the distal end of the linear spring at least partially contacts the item and urges the item towards the support surface. As a result, the item is secured to the support surface without piercing or otherwise damaging the item. According to one preferred embodiment, the distal end of the linear spring defines a planar surface for at least partially contacting the item and urging the item towards the support surface. According to another preferred embodiment, the linear spring includes a reinforcing ridge adjacent the body portion.

In an alternate embodiment, the body portion defines a groove proximate to the second end of the body portion thereby defining an elongate member extending from the body portion to a distal end. Advantageously, the distal end of the elongate member at least partially contacts the item and urges the item towards the support surface without piercing or otherwise damaging the item. According to one preferred embodiment, the elongate member defines a planar surface for at least partially contacting the item and urging the item towards the support surface. In another preferred embodiment, the elongate member includes a reinforcing ridge adjacent the body portion.

In another alternate embodiment, the second end of the body portion defines a recessed surface for at least partially contacting the item and urging the item towards the support surface such that the item is secured between the recessed surface and the support surface. In one preferred embodiment, the recessed surface defines perpendicular lateral sides.

Accordingly, there has been provided a push pin capable of securing an item to a support surface without puncturing or otherwise damaging the item. The push pin is also capable of securing items having varying geometries, including square, rectangular, triangular and curvilinear geometries. Additionally, the head of the push pin facilitates gripping by the user when inserting and withdrawing the push pin into and out of the support surface, respectively.

BRIEF DESCRIPTION OF THE DRAWINGS

The foregoing and other advantages and features of the invention, and the manner in which the same are accomplished, will become more readily apparent upon consideration of the following detailed description of the invention taken in conjunction with the accompanying drawings, which illustrate preferred and exemplary embodiments, and wherein:

FIG. 4 is a perspective view illustrating another preferred embodiment of a push pin according to the present invention;

FIG. 5 is a cross section of the push pin of FIG. 4 securing an item against a support structure;

FIG. 6 is a cross section of the push pin of FIG. 4 taken along lines 6—6 of FIG. 5;

FIG. 10 is a perspective view illustrating another preferred embodiment of a push pin according the present invention;

FIG. 11 is a cross section of the push pin of FIG. 10 securing an item against a support structure;

FIG. 12 is a cross section of the push pin of FIG. 10 taken along lines 12—12 of FIG. 11;

FIG. 13 is a perspective view illustrating another preferred embodiment of a push pin according to the present invention;

FIG. 14 is a cross section of the push pin of FIG. 13 securing an item against a support structure taken along lines 14—14 of FIG. 15; and FIG. 15 is a cross section of the push pin of FIG. 13.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
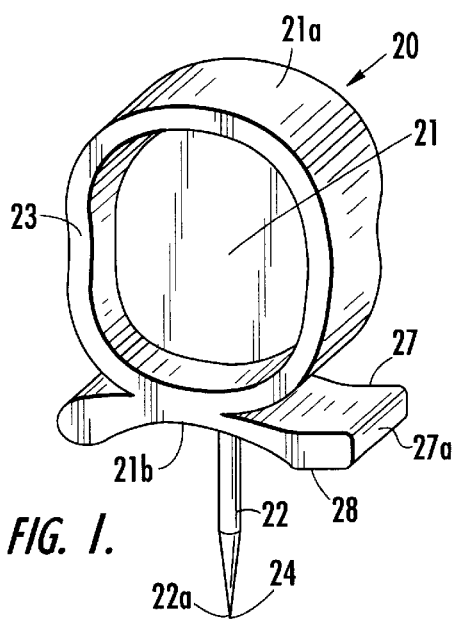
FIG. 1 perspective view illustrating one preferred embodiment of a push pin according to the present invention.
Figure 3:
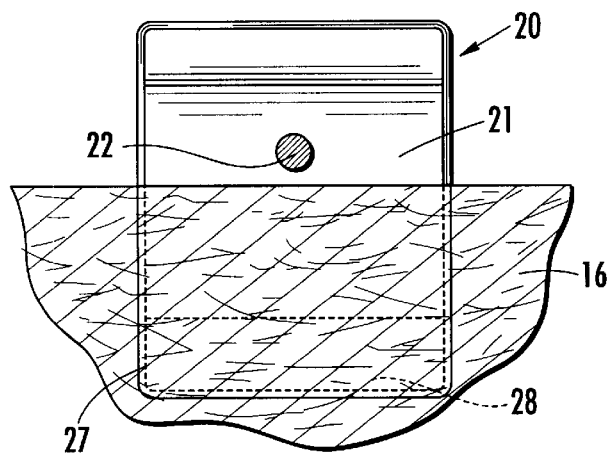
FIG. 3 is a cross section of the push pin of FIG. 1 taken along lines 3—3 of FIG. 2.
Figure 2:
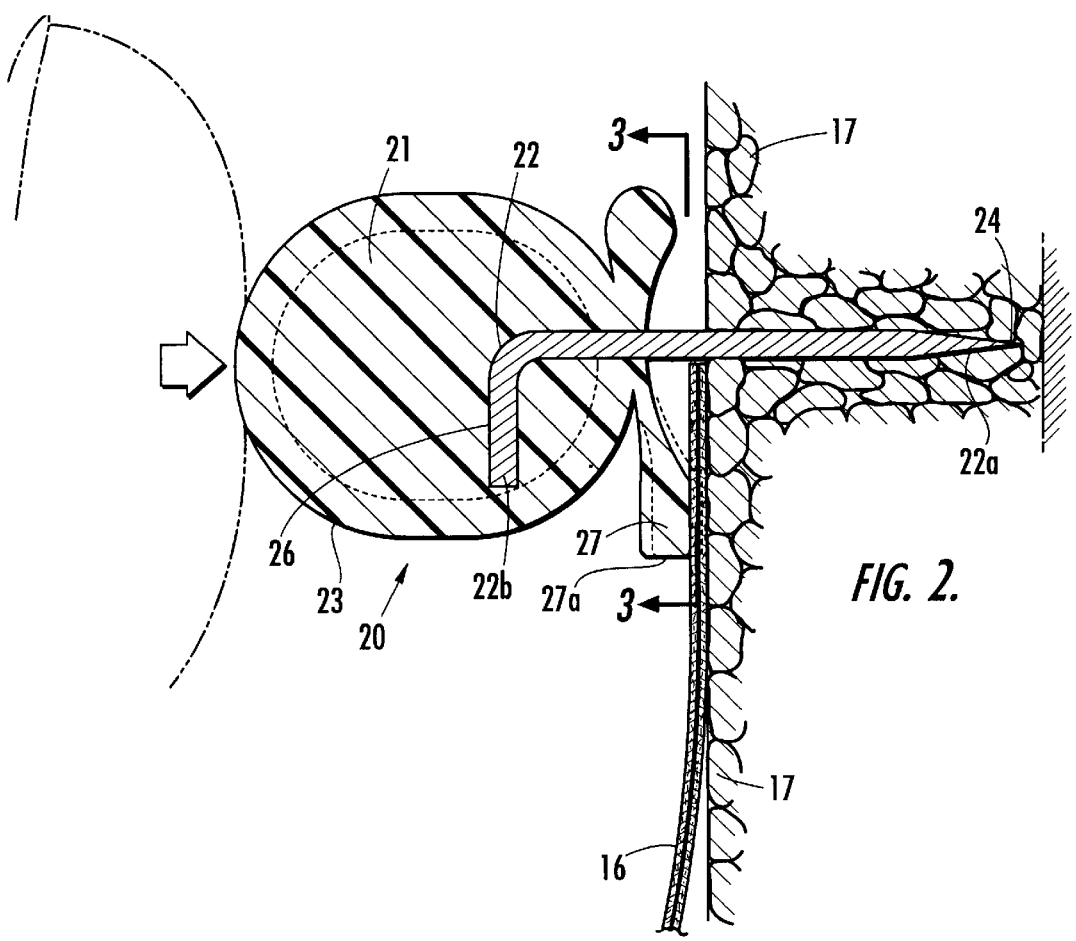
FIG. 2 is a cross section of the push pin of FIG. 1 securing an item against a support structure.

Referring now to the drawings, and in particular to FIGS. 1–3, where there is shown one embodiment of a push pin 20 according to the present invention. The push pin 20 includes a body portion 21 and a pin 22. The body portion 21 includes first and second ends 21a, 21b and can have a variety of configurations, including a curvilinear, square, rectangular, or triangular configuration. In the embodiment shown in FIG. 1 the push pin 20 has a curvilinear configuration. The body portion 21 can be formed of a variety of materials, including stainless steel or an elastomer, such as expanded neoprene, an injection molded plastic, or a high density polypropylene. As shown in FIG. 1, the body portion 21 preferably includes a flange or raised circumferential portion 23 around the periphery of one or both sides of the body portion, which flange assists the user in positioning the push pin 20, such as when the user grasps the body portion of the push pin to insert or withdraw the push pin into or away from the support surface 17, respectively. In one preferred embodiment, as illustrated in FIG. 1, one or both sides of the body portion 21 are concaved to further assist the user in gripping the body portion of the push pin 20.

The pin 22 of the push pin 20 has first and second ends 22a, 22b. The first end 22a of the pin 22 defines a point 24 adapted for insertion above a piece of paper, a photograph, postcard, poster or similar item 16 (hereinafter referred to as the "item") and into a support surface 17. The second end 22b of the pin 22 is secured to the second end 21b of the body portion 21. In a preferred embodiment, at least a portion of the second end 22b of the pin 22 is secured within the body portion 21, which is most easily accomplished when forming the body portion. In one preferred embodiment, the tip 26 of the second end 22b of the pin 22 is bent at an angle to the central axis of the pin to ensure that the pin is anchored within the body portion 21. As shown in FIG. 2, the tip 26 of the second end 22b of the pin 22 is preferably bent at 90° relative to the central axis of the pin. The central axis of the pin 22 may coincide with or be offset from the central axis of the body portion 21. In the embodiment shown in FIG. 1, the central axis of the pin 22 coincides with the central axis of the body portion 21.

Referring to FIGS. 1 and 2, the push pin 20 includes an elongate member 27 extending from the second end 21a of the body portion 21 to a distal end 27a. The elongate member 27 is preferably formed integrally with the body portion 21 out of stainless steel or an injection molded plastic and has sufficient resiliency to resist deflection out from the plane defined by the elongate member. As such, the elongate member 27 functions as a linear spring. When securing an item 16 to a support surface 17, the item is first positioned on the support surface in a pre-selected location and orientation. Thereafter, as shown in FIG. 2, the item 16 is secured to the support surface 17 by inserting the pin 22 of the push pin 20 into the support surface near an edge of the item and firmly anchoring the push pin within the support surface by inserting the entire portion of the pin that projects beyond the second end 21b of the body portion 21 into the support surface. Advantageously, when the pin 22 of the push pin 20 is securely inserted into and within the support surface 17, the distal end 27a of the elongate member 27 at least partially contacts the item 16 and urges the item towards the support surface. As a result, the item 16 is secured to the support surface 17 without piercing or otherwise damaging the item. According to one preferred embodiment, as shown in FIG. 3, the distal end 27a of the elongate portion 27 defines a planar surface 28, which acts like a foot to at least partially contact the item 16 and urge the item towards the support surface 17.

Referring to FIGS. 4–6, there is shown another embodiment of a push pin 30 according to the present invention, including a body portion 31 and a pin 32. The description pertaining to the formation of the body portion 31 and attachment of the pin 32 to the body portion are as previously discussed above and, thus, will not be repeated. In the embodiment shown in FIG. 4, the body portion 31 preferably includes a recessed portion 33 on one or more lateral sides 31c of the body portion, which recessed portion assists the user in positioning the push pin 30, such as when the user grasps the body portion of the push pin to insert or withdraw the push pin into or away from the support surface 17, respectively.

Referring to FIGS. 4 and 5, the body portion 31 of the push pin 30 includes a groove or slot 35, which slot defines an elongate member 37 extending from the second end 31b of the body portion 31 to a distal end 37a. In this embodiment, the body portion 31 is preferably formed out of stainless steel or an injection molded plastic. As with the embodiment of the push pin 20 illustrated in FIG. 1, the elongate member 37 has sufficient resiliency to resist deflection out from the plane defined by the elongate member such that the elongate member functions as a linear spring. When securing an item 16 to a support surface 17, the item is first positioned on the support surface in a pre-selected location and orientation. Thereafter, as shown in FIG. 5, the item 16 is secured to the support surface 17 by inserting the pin 32 of the push pin 30 into the support surface 17 near an edge of the item and firmly anchoring the push pin within the support surface by inserting the entire portion of the pin that projects beyond the second end 31b of the body portion 31 into the support surface. Advantageously, when the pin 32 of the push pin 30 is securely inserted into and within the support surface 17, the distal end 37a of the elongate member or linear spring 37 at least partially contacts the item 16 and urges the item towards the support surface. As a result, the item 16 is secured to the support surface 17 without piercing or otherwise damaging the item. According to one preferred embodiment, as shown in FIG. 3, the distal end 37a of the elongate portion 37 defines a planar surface 38, which acts like a foot to at least partially contact the item 16 and urge the item towards the support surface 17. According to another preferred embodiment, as illustrated in FIGS. 4 and 5, the elongate member 37 may include a reinforcing ridge 39 to improve the resistance of the elongate member to both deflection out of the plane defined by the elongate member and any cyclical stresses created in the elongate member due to repeated insertion and withdrawal of the pin 32 into and away from the support surface 17.

Figure 7:
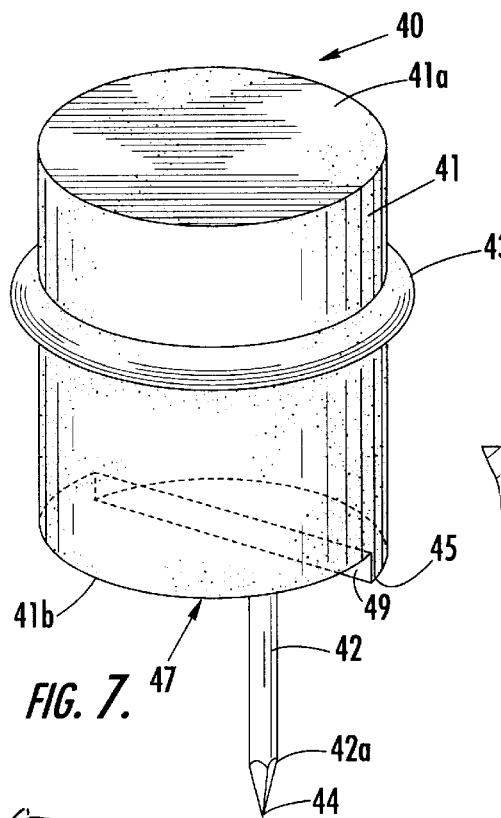
FIG. 7 is a perspective view illustrating another preferred embodiment of a push pin according to the present invention.
Figure 9:
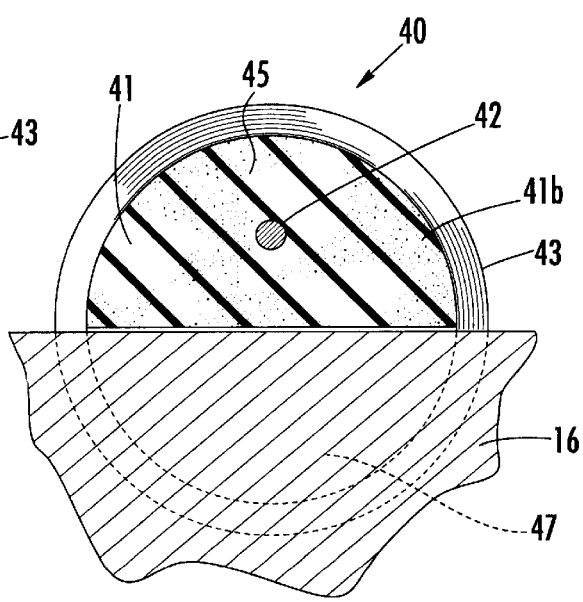
FIG. 9 is a cross section of the push pin of FIG. 7 taken along lines 9—9 of FIG. 8.
Figure 8:
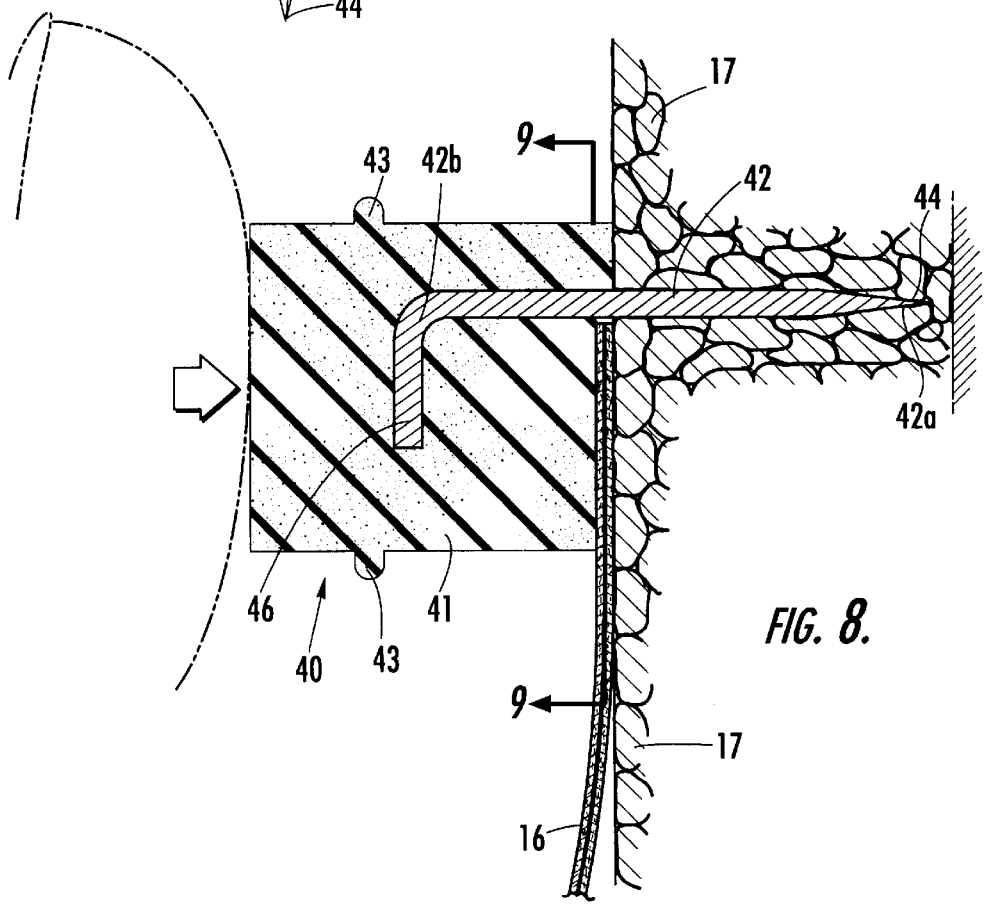
FIG. 8 is a cross section of the push pin of FIG. 7 securing an item against a support structure.

Referring to FIGS. 7–9, there is shown another embodiment of a push pin 40 according to the present invention, including a body portion 41 having a circular configuration and a pin 42. The description pertaining to the formation of the body portion 41 and attachment of the pin 42 to the body portion are as previously discussed above and, thus, will not be repeated except to note that in this embodiment, the central axis of the pin 42 is preferably offset from the central axis of the body portion 41. As shown in FIGS. 7 and 8, the second end 41b of the body portion 41 defines a recessed surface 47 for at least partially contacting the item 16 and urging the item towards the support surface 17 such that the item is secured between the recessed surface and the support surface. As shown in FIG. 8, the recessed surface 47 of the second end 41b of the body portion 41 is bounded by a lateral side 49 defined by the non-recessed surface 45 of the second end, which lateral side preferably provides a backing or stop for the edge of the item 16 when the push pin 40 is secured to the support surface 17. As shown in FIG. 7, the body portion 41 preferably includes a raised circumferential portion 43, which assists the user in positioning the push pin 40, such as when the user grasps the body portion of the push pin to insert or withdraw the push pin into or away from the support surface 17, respectively.

When securing an item 16 to a support surface 17, the item is first positioned on the support surface in a pre-selected location and orientation. Thereafter, as shown in FIG. 8, the item 16 is secured to the support surface 17 by inserting the pin 42 of the push pin 40 into the support surface 17 near an edge of the item, rotating the body portion 41 about the central axis of the pin such that the recessed surface 47 at least partially overlays the edge of the item, and then firmly anchoring the push pin within the support surface by inserting the entire portion of the pin that projects beyond the second end 41b of the body portion 41 into the support surface. The edge of the item 16 is preferably positioned against the lateral side 49 defined by the non-recessed surface 45 of the second end 41b of the body portion 41. Advantageously, when the pin 42 of the push pin 40 is securely inserted into and within the support surface 17, the recessed surface 47 of the second end 41b of the body portion 41 at least partially contacts the item 16 and urges the item towards the support surface such that the item is secured or pinched between the recessed surface and the support surface. As a result, the item 16 is secured to the support surface 17 without piercing or otherwise damaging the item.

Referring to FIGS. 10–12, there is shown another embodiment of a push pin 50 according to the present invention, which embodiment is similar to the embodiment shown in FIGS. 7–9 except that the body portion 51 has a rectangular configuration rather than a circular configuration. Since the description pertaining to the embodiment shown in FIGS. 10–12 is essentially the same as the description above pertaining to the embodiment shown in FIGS. 7–9, it will not be repeated. Like numbers refer to like elements throughout.

Referring to FIGS. 13–15, there is shown another embodiment of a push pin 60 according to the present invention, including a body portion 61 having a triangular configuration and a pin 62. The description pertaining to the formation of the body portion 61 and attachment of the pin 62 to the body portion are as previously discussed above except that in this embodiment the central axis of the pin 62 is also preferably offset from the central axis of the body portion 61. As shown in FIGS. 13–15, the second end 61b of the body portion 61 defines a recessed surface 67 for at least partially contacting the item 16 and urging the item towards the support surface 17 such that the item is secured between the recessed surface and the support surface. As shown in FIGS. 13 and 15, the recessed surface 67 of the second end 61b of the body portion 61 is bounded by the perpendicular lateral sides 69 of the non-recessed surfaces 65 of the second end, which lateral sides preferably provide a backing or stop for the corner edges of the item 16 when the push pin 60 is secured to the support surface 17. As shown in FIG. 13, the body portion 61 preferably includes a raised circumferential portion 63, which assists the user in positioning the push pin 60, such as when the user grasps the body portion of the push pin to insert or withdraw the push pin into or away from the support surface 17, respectively.

When securing an item 16 to a support surface 17, the item is first positioned on the support surface in a preselected location and orientation. Thereafter, as shown in FIG. 14, the item 16 is secured to the support surface 17 by inserting the pin 62 of the push pin 60 into the support surface 17 near an edge of the item, rotating the body portion 61 about the central axis of the pin such that the recessed surface 67 at least partially overlays the corner of the item, and then firmly anchoring the push pin within the support surface by inserting the entire portion of the pin that projects beyond the second end 61b of the body portion 61 into the support surface. The edge of the item 16 is preferably positioned against the lateral sides 69 defined by the non-recessed surface 65 of the second end 61b of the body portion 61. Advantageously, when the pin 62 of the push pin 60 is securely inserted into and within the support surface 17, the recessed surface 67 of the second end 61b of the body portion 61 at least partially contacts the item 16 and urges the item towards the support surface such that the item is secured or pinched between the recessed surface and the support surface. As a result, the item 16 is secured to the support surface 17 without piercing or otherwise damaging the item.

Accordingly, there has been provided a push pin capable of securing an item to a support surface without puncturing or otherwise damaging the item. The push pin is also capable of securing items having varying geometries, including square, rectangular, triangular and curvilinear geometries. Additionally, the head of the push pin facilitates gripping by the user when inserting and withdrawing the push pin into and out of the support surface, respectively.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A push pin for securing an item to a support surface, comprising:
    a body portion;
    a pin having first and second ends, said first end of said pin defining a point adapted for insertion into the support surface, said second end of said pin being secured to said body portion; and
    a linear spring extending from only one side of said body portion to a distal end, said body portion extending above and at least partially overhanging said one linear spring in a direction toward said distal end to thereby form a gap therebetween, said distal end of said linear spring adapted to at least partially contact the item and urge the item towards the support surface.

2. A push pin according to claim 1, wherein said distal end of said linear spring defines a planar surface for at least partially contacting the item and urging the item towards the support surface.

3. A push pin according to claim 1, wherein the central axis of said pin coincides with the central axis of said body portion.

4. A push pin according to claim 1, wherein the central axis of said pin is offset from the central axis of said body portion.

5. A push pin according to claim 1, wherein said body portion has a curvilinear configuration.

6. A push pin according to claim 1, wherein said body portion has a configuration selected from a group consisting of a square, a rectangle and a triangle.

7. A push pin according to claim 1, wherein said body portion is formed from an elastomer.

8. A push pin according to claim 1, wherein said body portion defines a raised circumferential portion to facilitate positioning of the push pin.

9. A push pin according to claim 1, wherein said linear spring further comprises a reinforcing ridge adjacent said body portion.

10. A push pin for securing an item to a support surface, comprising:
    a body portion having first said second ends;
    a pin having first and second ends, said first end of said pin defining a point adapted for insertion into the support surface, said second end of said pin being secured to said body portion; and
    wherein said body portion defines a groove proximate to said second end of said body portion, said groove defining and elongate member extending from only one side of said body portion to a distal end, said body portion extending above and at least partially overhanging said one elongate member in a direction toward said distal end to thereby form said groove, said distal end of said elongate member adapted to at least partially contact the item and urge the item towards the support surface.

11. A push pin according to claim 10, wherein said distal end of said elongate member defines a planar surface for at least partially contacting the item and urging the item towards the support surface.

12. A push pin according to claim 10, wherein the central axis of said pin coincides with the central axis of said body portion.

13. A push pin according to claim 10, wherein the central axis of said pin is offset from the central axis of said body portion.

14. A push pin according to claim 10, wherein said body portion has a curvilinear configuration.

15. A push pin according to claim 10, wherein said body portion has a configuration selected from a group consisting of a square, a rectangle and a triangle.

16. A push pin according to claim 10, wherein said body portion is formed from an elastomer.

17. A push pin according to claim 10, wherein said body portion defines a raised circumferential portion to facilitate positioning of the push pin.

18. A push pin according to claim 10, wherein said elongate member further comprises a reinforcing ridge adjacent said body portion.

19. A method of non-destructively securing all item to a support surface, comprising:

provviding at least one push pin comprising a body portion, a pin secured to the body portion, and a linear spring extending from only one side of the body portion to a distal end such that the body portion extends above and at least partially overhangs the linear spring in a direction toward said distal end to thereby form a gap therebetween;

positioning the item adjacent the support surface; and thereafter, inserting the pin of the push pin into the support surface adjacent the item such that the distal end of the linear spring at least partially contacts the item and urges the item towards the support surface.

20. A method according to claim 19 further comprising repeating said positioning and inserting steps around the perimeter of the item.

* * * * *

UNITED STATES PATENT AND TRADEMARK OFFICE
CERTIFICATE OF CORRECTION

PATENT NO. : 6,196,782 B1
DATED : March 6, 2001
INVENTOR(S) : Wagner et al.

Page 1 of 1

It is certified that error appears in the above-identified patent and that said Letters Patent is hereby corrected as shown below:

Title page, item [54] and Column 1, line 1,
In the title, after "PUSH PIN" insert -- FOR NON-DESTRUCTIVE SECURING OF ITEMS --.

Title page, item [56] References Cited,
U.S. PATENT DOCUMENTS, line 20, "Miller" should read -- Helvig et al. --;
Page 2, column 1, line 3, "Hatashi" should read -- Hayashi --.

Column 8,
Line 35, "said" should read -- and --;
Line 42, "and" should read -- an --.

Column 9,
Line 7, "all" should read -- an --.

Signed and Sealed this

Twenty-third Day of October, 2001

Attest:

*Nicholas P. Godici*

NICHOLAS P. GODICI
*Attesting Officer*   *Acting Director of the United States Patent and Trademark Office*